United States Patent
Bezawada et al.

(10) Patent No.: US 12,299,640 B2
(45) Date of Patent: May 13, 2025

(54) RICH COMMUNICATION SERVICES SECURITY RECRUITING SYSTEM

(71) Applicant: ADP, Inc., Roseland, NJ (US)

(72) Inventors: Suresh Bezawada, Hyderabad (IN); Sundeep Kumar Raikhelkar, Hyderabad (IN); Venkata Suresh Babu Madamanchi, Hyderabad (IN)

(73) Assignee: ADP, Inc., Roseland, NJ (US)

( * ) Notice: Subject to any disclaimer, the term of this patent is extended or adjusted under 35 U.S.C. 154(b) by 35 days.

(21) Appl. No.: 16/828,634

(22) Filed: Mar. 24, 2020

(65) Prior Publication Data

US 2021/0304150 A1    Sep. 30, 2021

(51) Int. Cl.
*G06Q 10/1053* (2023.01)
*G06Q 50/40* (2024.01)
(Continued)

(52) U.S. Cl.
CPC ......... *G06Q 10/1053* (2013.01); *G06Q 50/40* (2024.01); *H04L 51/58* (2022.05); *H04W 4/12* (2013.01)

(58) Field of Classification Search
CPC ............... G06Q 10/1053; G06Q 50/01; G06Q 10/063112; G06Q 10/105; H04L 51/38; H04W 4/12
See application file for complete search history.

(56) References Cited

U.S. PATENT DOCUMENTS 10,499,206 B1 * 12/2019 Dar ..................... H04L 61/2007
2011/0196801 A1 * 8/2011 Ellis ..................... G06F 16/334
                                                                705/321

(Continued)

FOREIGN PATENT DOCUMENTS

EP    3404875 B1 *  9/2019  ........... G06F 3/0412
EP    3697032 B1 * 10/2021  ........... G06F 3/0481

OTHER PUBLICATIONS

E. Bagarukayo and E. Mwesigwa, "Jobs256' Mobile app linking job seekers to job opportunities," 2017 IST-Africa Week Conference (IST-Africa), 2017, pp. 1-7, doi: 10.23919/ISTAFRICA.2017.8102392 (Year: 2017).*

(Continued)

*Primary Examiner* — Lynda Jasmin
*Assistant Examiner* — Maame Ballou
(74) *Attorney, Agent, or Firm* — Foley & Lardner LLP

(57) ABSTRACT

A method, a computer system, and a computer program product for communicating employment opportunities to job candidates. A recruiting system receives a job posting from an organization communicating over a first network. The recruiting system matches the job requirements in the job posting to a candidate profile. The recruiting system identifies a mobile device associated with the candidate profile, and an interaction template that describes a conversational flow of messages for soliciting an application for the job from a job candidate. A dialogue is initiated with the mobile device, by sending a transmission object built from a message in the interaction template. A response received from the mobile device based on rules that describe a conversational flow for the interaction template. If the response is positive, the recruiting system submits the user as a candidate for the job by posting the information in the response to the organization.

21 Claims, 7 Drawing Sheets

(51) Int. Cl.
*H04L 51/58* (2022.01)
*H04W 4/12* (2009.01)

(56) References Cited

U.S. PATENT DOCUMENTS

| | | | | |
|---|---|---|---|---|
| 2015/0248649 | A1* | 9/2015 | Avats | G06Q 10/1053 |
| | | | | 705/321 |
| 2016/0140506 | A1* | 5/2016 | Kostelnik | G06Q 10/1053 |
| | | | | 705/321 |
| 2018/0240071 | A1* | 8/2018 | Kenthapadi | H04L 67/306 |
| 2018/0241575 | A1* | 8/2018 | Marinho | H04L 9/321 |
| 2018/0322463 | A1* | 11/2018 | Pattabiraman | G06Q 50/01 |
| 2019/0050914 | A1* | 2/2019 | O'Connor | G06Q 30/0276 |
| 2019/0182382 | A1* | 6/2019 | Mazza | H04L 51/02 |
| 2019/0197487 | A1* | 6/2019 | Jersin | G06F 16/635 |
| 2019/0356617 | A1* | 11/2019 | Synal | H04L 65/1016 |
| 2021/0006515 | A1* | 1/2021 | Downs | H04L 51/046 |
| 2021/0256417 | A1* | 8/2021 | Kneller | G06N 3/088 |

OTHER PUBLICATIONS

Rapisardi, Dario, Bo Tian, and Amit Fatnani. "Messaging continuity and lead generation using conversational ads." (2018) (Year: 2018).*

* cited by examiner

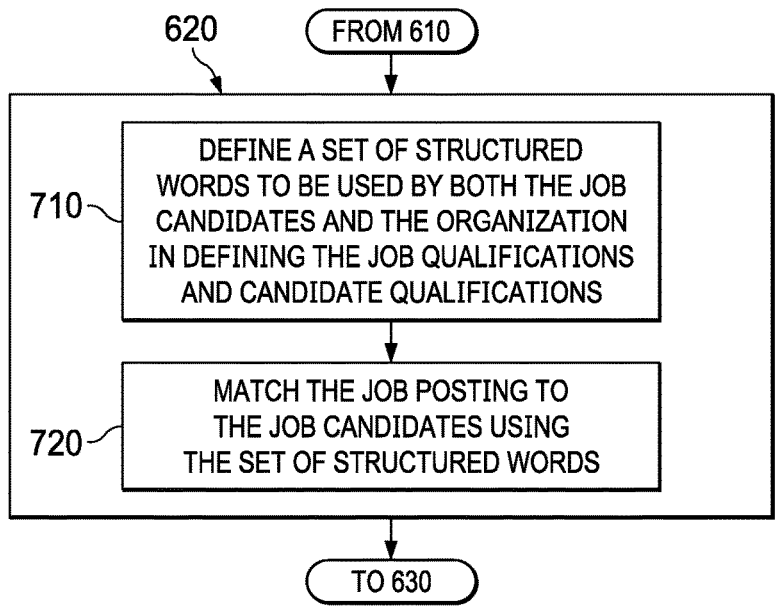
FIG. 7
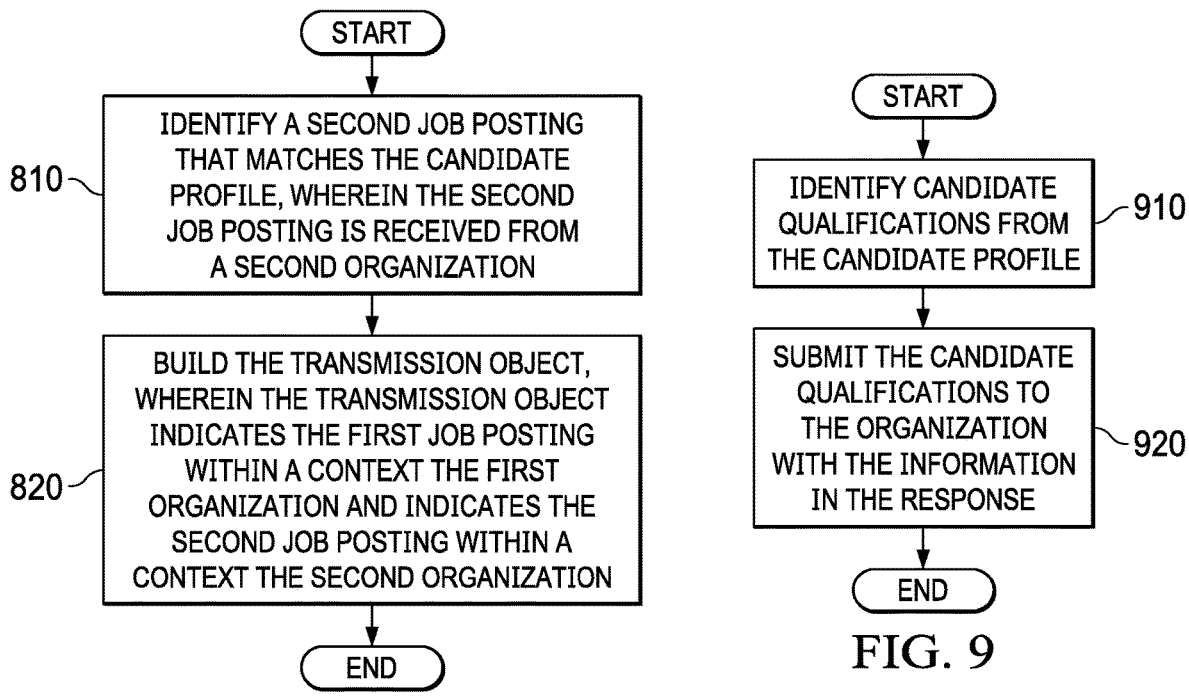
FIG. 8
FIG. 9

RICH COMMUNICATION SERVICES SECURITY RECRUITING SYSTEM

BACKGROUND INFORMATION

1. Field

The present disclosure relates generally to an improved recruiting system for a device and, in particular, to a method and system for authenticating a transaction from a user at a first device using credentials from a second device.

2. Background

Recruiting and retaining qualified employees is a perennial issue facing organizations. Conversely, employees seek to navigate their careers within and outside their organizations. Curiously, research indicates that only a small percentage of employees leave a company for higher pay. The majority leave for opportunities to develop professionally.

Each employment position necessarily requires specific skill sets. Matching employees or prospective employees with jobs and career paths typically involves establishing specific credentials required for each job. However, an official credential is not always an accurate indicator of past or future work performance or an accurate indicator of required skill sets for employment positions. They are at best indirect proxies for such skills.

Companies that help employers find, hire and manage talent, are also using research to better understand today's workforce. According to research, most workers stumble into jobs. This leads one to believe that existing job boards (e.g., Indeed, Monster etc.) or career social platforms (e.g., LinkedIn etc.) are ineffective at matching and informing qualified job seekers with existing job posts. This, then, leads to wasted time on behalf of job seekers and recruiters or employers, and major global losses in productivity since workers are not in the best fit jobs and thus are not reaching their full potential.

Even when qualified candidates are identified, job applicants are not notified intuitively. The application process usually does not support direct two-way communication. Instead, E-mail and text are prevalent channels of communication, often requiring multiple steps by applicants. More importantly, messages are not always sent from trusted sources and thereby result in candidates losing the most appropriate of opportunities posted by recruiting platforms.

It would be desirable to have a method and apparatus that take into account at least some of the issues discussed above, as well as other possible issues. For example, it would be desirable to have a method and apparatus that overcome a technical problem with timely identifying and notifying qualified job applicants of employment opportunities.

SUMMARY

Embodiments of the present disclosure provide a method, computer system, and computer program product for communicating employment opportunities to job candidates. In one illustrative example, a recruiting system receives a job posting from an organization communicating over a first network. The job posting includes job requirements for job candidates. The recruiting system matches the job requirements in the job posting to a candidate profile. The recruiting system identifies a mobile device of a user associated with the candidate profile. The recruiting system identifies an interaction template associated with the job posting. The interaction template describes a conversational flow of messages for soliciting an application for the job from a job candidate. The recruiting system initiates a dialogue with the mobile device. The dialogue includes sending a transmission object built from a message in the interaction template. The recruiting system processes a response received from the mobile device. The information in the response is processed based on rules that describe a conversational flow for the interaction template. In response to a positive response from the user, the recruiting system submits the user as a candidate for the job by posting the information in the response to the organization.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will be best understood by reference to the following detailed description of an illustrative embodiment of the present disclosure when read in conjunction with the accompanying drawings, wherein:

FIG. 7 is a flowchart of a process for matching the job posting to the job candidates in accordance with an illustrative embodiment;

FIG. 8 is a flowchart of a process for communicating multiple employment opportunities to job candidates in accordance with an illustrative embodiment;

FIG. 9 is a flowchart of a process for submitting a candidate for the job in accordance with an illustrative embodiment.

DETAILED DESCRIPTION

The illustrative embodiments provide a method, a computer system, and a computer program product for communicating employment opportunities to job candidates. In one illustrative example, a recruiting system receives a job posting from an organization communicating over a first network. The job posting includes job requirements for job candidates. The recruiting system matches the job requirements in the job posting to a candidate profile. The recruiting system identifies a mobile device of a user associated with the candidate profile. The recruiting system identifies an interaction template associated with the job posting. The interaction template describes a conversational flow of messages for soliciting an application for the job from a job candidate. The recruiting system initiates a dialogue with the mobile device. The dialogue includes sending a transmission object built from a message in the interaction template. The recruiting system processes a response received from the mobile device. The information in the response is processed based on rules that describe a conversational flow for the interaction template. In response to a positive response from the user, the recruiting system submits the user as a candidate for the job by posting the information in the response to the organization.

Figure 1:
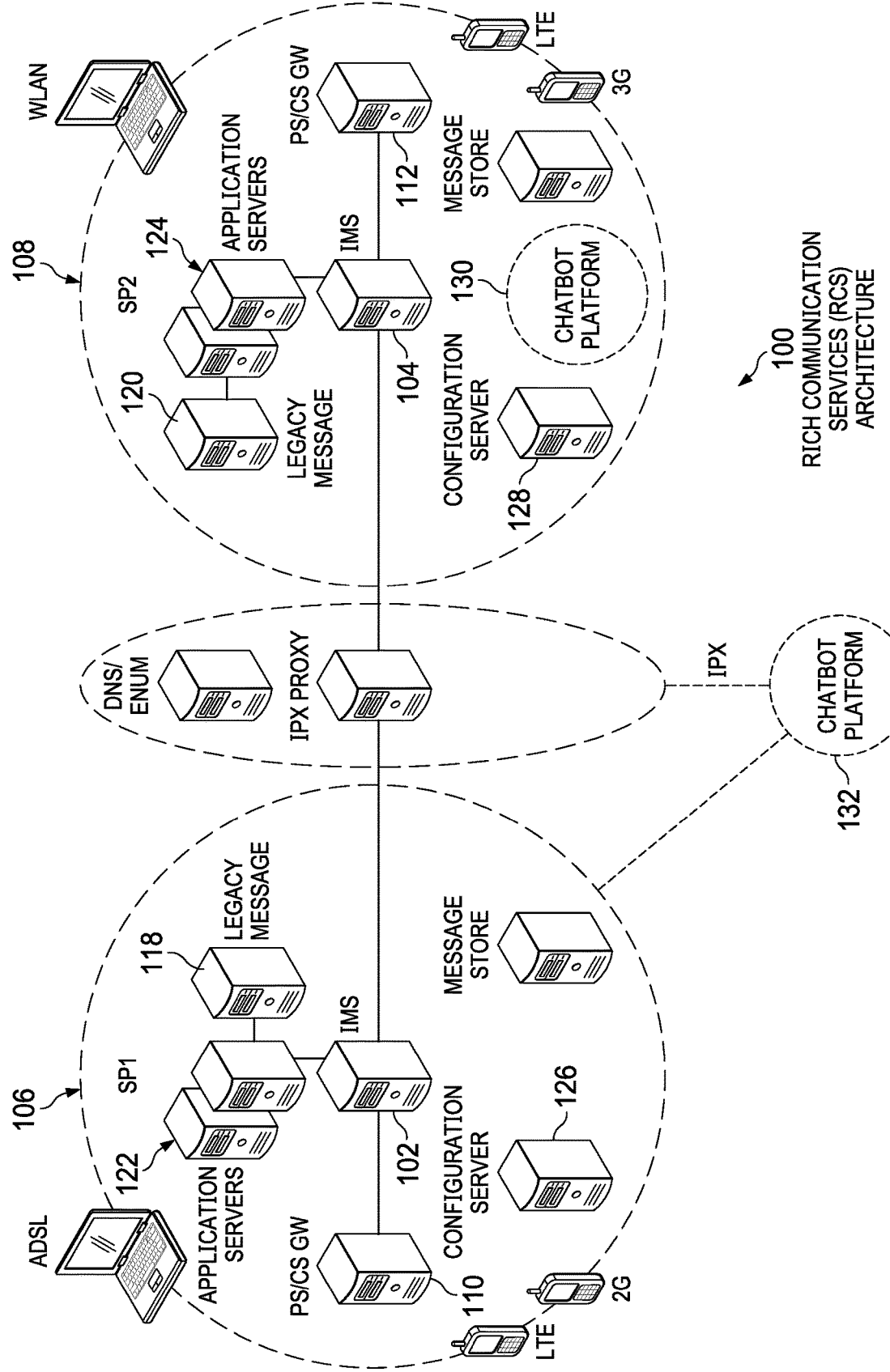
FIG. 1 is an illustration of a block diagram of a simplified example of the Rich Communication Services architecture in accordance with an illustrative embodiment.

With reference now to the figures and, in particular, with reference to FIG. 1, an illustration of a block diagram of a simplified example of the Rich Communication Services architecture is depicted in accordance with an illustrative embodiment.

Rich Communication Services (RCS) architecture 100 is a communication protocol between mobile-telephone carriers and between phone and carrier, aiming at replacing Short Message Service (SMS) messages with a text message system that is richer, provides phonebook polling (for service discovery), and transmits in-call multimedia. RCS combines different services defined by 3GPP and Open Mobile Alliance (OMA) with an enhanced phonebook. Another phone's capabilities and presence information can be discovered and displayed by a mobile phone. RCS reuses 3GPP specified Internet Protocol Multimedia Subsystem (IMS) core system as the underlying service platform taking care of issues such as authentication, authorization, registration, charging, and routing.

For RCS, the base network element is IMS core system 102, 104 which enables peer-to-peer communication between RCS clients. Other network nodes can be deployed by RCS Service Providers 106, 108.

FIG. 1 shows examples of two RCS Service Providers 106, 108 exchanging traffic with each other using the standard NNI mechanisms, such as IPX and IP Packet Exchange. Each of Service Provider 106, 108 may choose a different approach to implement a function within the Service Provider domain not influencing the interoperable Network-to-Network Interface (NNI) aspects. RCS Service Provider 106, 108 may provision different services for different users and/or devices based on internal policies, such as having an active subscription to one service.

PS/CS gateway (GW) 110, 112 is used for interworking between Circuit Switched (CS) and Packet Switched (PS) voice, for example, Voice over Long Term Evolution (VoLTE). MSG Store 114, 116 relates to the CPM (Converged IP Messaging) Message Store Server. Legacy Msg 118, 120 refers to the Short Message Service (SMS)/Multimedia Message Service (MMS) services that may be utilized via an IWF (Interworking Function) located in the group of Application Servers (ASs) 122, 124. In addition to these IWF node(s), Application Servers (ASs) 122, 124 may also include various other nodes used by the RCS services, for example, a Presence Server, a Messaging Server, a Multimedia Telephony (MMTEL) Application Server, and support of Chatbot Functionality. Autoconfiguration Server 126, 128 is used to provide clients with a configuration to support RCS services.

RCS architecture 100 also provides support for Chatbot communications through the integration of Chatbot Platforms 130, 132. These platforms can either connect through the interconnect infrastructure or connect directly to an RCS Service Provider's network. A Chatbot is an RCS-based automated service provided to users whose output is presented in a conversational form. Services are often provided as a piece of software interfacing with one or more users aiming to simulate intelligent human conversation.

RCS compliant access networks include, but are not limited to, those illustrated in FIG. 1. Thus, deploying the RCS service does not indicate a 3G network should always be deployed.

Figure 2:
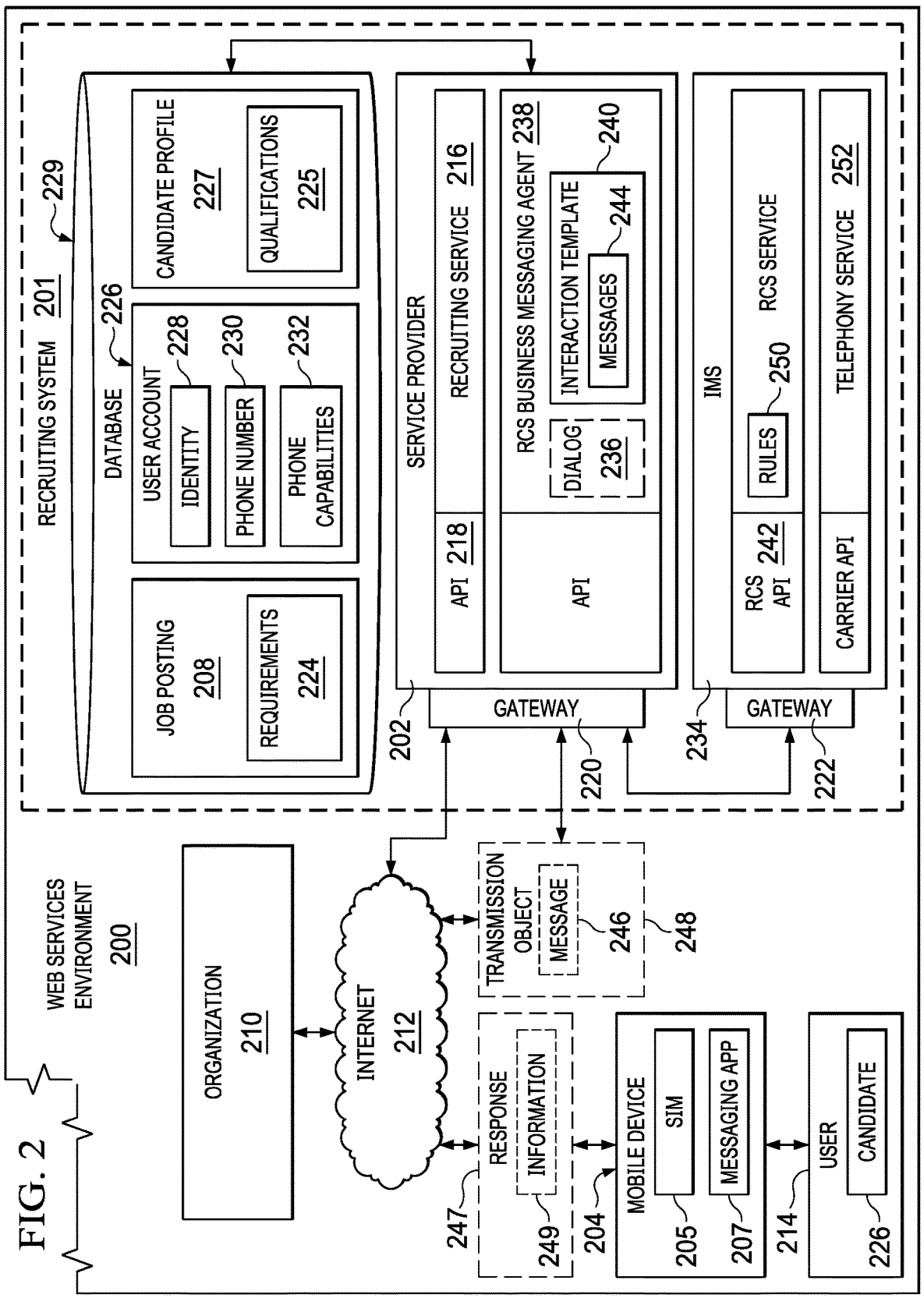
FIG. 2 is a block diagram of a web services environment in accordance with an illustrative embodiment.

With reference to FIG. 2, an illustration of a web services environment is depicted in a form of a block diagram in accordance with an illustrative embodiment. In this illustrative example, web services environment 200 is an example of a system that leverages RCS messaging to enable communicating employment opportunities to job candidates over one or more computer networks.

The one or more computer networks may include at least one of the Internet, a private network, a public network, or some other type of network. As used herein, the phrase "at least one of," when used with a list of items, means different combinations of one or more of the listed items may be used, and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

In this illustrative example, web services environment 200 enables communications between a plurality of client devices and plurality of resources. Each client device of plurality of client devices may also be referred to as a service requestor. Each resource of plurality of resources may also be referred to as a service provider that provides one or more services.

Web services environment 200 includes recruiting system 201. Recruiting system 201 may be implemented in software, hardware, firmware, or a combination thereof. When software is used, the operations performed by recruiting system 201 may be implemented in program code configured to run on hardware, such as a processor unit. When firmware is used, the operations performed by recruiting system 201 may be implemented in program code and data and stored in persistent memory to run on a processor unit. When hardware is employed, the hardware may include circuits that operate to perform the operations in recruiting system 201.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Recruiting system 201 may be implemented in one or more computer systems. The computer systems are hardware systems that include one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

In one illustrative example, one or more technical solutions are present that overcome a technical problem with reliably communicating employment opportunities to job candidates. As a result, one or more technical solutions may provide a technical effect of communicating employment opportunities to job candidates by leveraging RCS messaging.

As depicted, service provider 202 provides rich communication services to one or more clients. Service provider 202 may provision different services for different users and/or devices based on internal policies, such as, for example, but not limited to, a client having an active subscription to one or more services.

Each client of plurality of clients and each resource of plurality of resources may take the form of software. Further, each client device in plurality of client devices and each resource of plurality of resources may be run on one or more computer devices. For example, a client device of plurality of client devices may be implemented on hardware that includes at least one of a computer system, a processor unit, a microprocessor, a tablet, a laptop, a smart television, a smartphone, or some other type of data processing system or electronic device. Similarly, a resource of plurality of resources may be implemented on hardware that includes at least one of a computer system, a processor unit, a microprocessor, a tablet, a laptop, a smart television, a smartphone, a server, or some other type of data processing system or electronic device.

In this illustrative example, the plurality of client devices can include mobile device 204. Mobile device 204 is a device carrying Subscriber Identity Module (SIM) 205 that is associated with the identity 228 used for rich communication services. The identity used for the rich communication services can be, for example, an Internet Protocol Multimedia Subsystem Public identity (IMPU) or a Mobile Subscriber Integrated Services Digital Network Number (MSISDN).

Mobile device 204 may use one or more different channels to connect to recruiting system 201 via network 212. In one illustrative example, mobile device 204 may access recruiting system 201 via a wireless cellular data network channel, such as a code division multiple access (CDMA) or a global system for mobiles (GSM), to access the Internet. Recruiting system 201 may access the Internet via a wired link. In this manner, mobile device 204 is in communication with recruiting system 201 via network 212.

In one illustrative example, job posting 208 may be affiliated with a particular entity providing RCS Business Messaging services. The entity may take the form of, for example, without limitation, a business entity, an organization, a corporation, or some other type of entity.

RCS Business Messaging services upgrades traditional SMS mobile messaging with branding, rich media, interactivity and analytics. RCS Business Messaging provides the opportunity for businesses to increase customers' engagement within the messaging app itself. By making use of business messaging using chatbots and artificial intelligence (AI), users engage with virtual assistants, thereby gaining direct access to a range of brands and services.

As depicted, a plurality of resources may be connected to and accessed over an internal network within recruiting system 201. In this illustrative example, the internal network may be in communication with Internet 212. Internet 212 may refer to the common use of the term "Internet." In some cases, Internet 212 may refer to a group of networked computers or a group of interconnected computer networks.

As depicted, mobile device 204 is affiliated with user 214. In one illustrative example, user 214 may attempt to access job posting 208 using one or more of a consumer application, an email client, a web browser, a login application, or some other type of software component that executes on mobile device 204. As depicted, user 214 accesses job posting 208 using messaging application 207 on mobile device 204.

Web services environment 200 includes plurality of resources and plurality of interfaces associated with plurality of services. Each interface in plurality of interfaces is associated with a corresponding resource. In this illustrative example, each interface in plurality of interfaces may also be referred to as an application programming interface (API). For example, application programming interface 218 is associated with, and provides access to, service 216.

Gateway 220 and 222 may be used to facilitate communications between user 214 and recruiting service 216. Gateway 220 and 222 may each be implemented using software, hardware, firmware, or a combination thereof. Depending on the implementation, gateway 220 and 222 may be implemented on the same computer device or on different computer devices that are in communication with each other. In this illustrative example, gateway 220 and 222 may communicate over an internal network in recruiting system 201. However, in other illustrative examples, gateway 220 may communicate with gateway 222 over Internet 212.

In this illustrative example, web services environment 200 includes service provider 202. Service provider 202 communicating employment opportunities to job candidates using the RCS Universal Profile of mobile device 204.

As used herein, the Universal Profile describes a single, global RCS implementation that will be deployed worldwide. The aim of this profile is to reduce the variation that exists today across various RCS profiles in order to simplify large-scale deployment.

The Universal Profile can be implemented by a developer or OEM, tightly integrating the capabilities and services within the address book and many other native touch points across the device. Alternatively, the Universal Profile can be implemented as a downloadable application that can be downloaded from application stores and accessible as a separate application on mobile device 204, usually within the device's application folder or desktop.

In this manner, recruiting system 201 provides methods and systems for communicating employment opportunities to job candidates.

In this illustrative example, service provider 202 receives job posting 208 from organization 210 communicating over a first network. Job posting 208 includes requirements 224 for job candidate 226. Requirements 224 can include information about the job, such as, for example, but not limited to, required skills, experience, compensation, and geographical locations.

In one illustrative example, recruiting service 216 defines a set of structured words to be used by both the job candidate 226 and organization 210 in defining the job requirements 224 and candidate qualifications 225. The set of structured words (i.e., structured data) may ensure that both employers and job seekers use the same structured words or data in posting their messages. The structured words or data may be centered around skills, experience, compensation, desired geographical locations or any structured words or data that the job matching company deems pertinent to accurately and effectively match job seekers to job postings. The use of the structured words or data allows for better matching of job posting 208 to candidate 226.

Recruiting service 216 matches the requirements 224 in the job posting 208 to a candidate profile 227. In one illustrative example, recruiting service 216 matches the job posting 208 to the job candidate 226 using the set of structured words. For example, a job posting 208 may be matched to candidate profile 227 based on similarities between requirements 224 and qualifications 225.

Recruiting service 216 identifies a mobile device 204 associated with the candidate profile 227. In one illustrative example, successfully matching the job posting 208 to the candidate profile 227 generates a lookup in database 229 based on identity 228 of user 214. The lookup identifies phone number 230 associated with mobile device 204. The lookup may additionally identify the cached capabilities of mobile device 204 that is associated with user 214.

RCS defines a telephony feature tag used to indicate to the IMS network whether the device supports RCS telephony services and hence can receive SMSs associated with the identity used for RCS when the device is not registered in IMS subsystem 234 for messaging. If the phone is not RCS capable, service provider 202 would fall back to the regular password request for authenticating the requested transaction. Therefore, if RCS is not supported by mobile device 204, message 246 is relayed to an MMS or SMS gateway (not shown). If mobile device 204 is RCS capable, dialogue 236 is initiated between RCS Business Messaging (RBM) agent 238 and RCS API 242.

RBM agent 238 is a representation of a business entity that can initiate and handle dialogues and transmissions. RBM agent 238 maintains business-specific information and assets for a business entity, such as an address, a phone number, a logo, and a banner image, as well as other suitable information such as project details and credentials. RBM agent 238 can entertain multiple dialogues with individual users according to the identified interaction template and the user's phone number, such as phone number 230.

Dialogue 236 is a materialized interaction template 240 at the time the first RBM transmission is being sent to the user. In one illustrative example, a lifetime of dialogue 236 is limited; if there are no messages exchanged for a while between the agent and the user, dialogue 236 is considered terminated.

In one illustrative example, dialogue 236 includes configuration information for sending and receiving user data and content. The configuration information in dialogue 236 includes at least one of Java Script Object Notation (JSON) service definition configuration information or other suitable types of configuration information. For example, service definitions may include information for using JSON objects through restful application programming interfaces to send and receive user data and content.

Unless a simple, communication-style message is send out, in which case a single transmission object is sufficient, RBM agent 238 typically initiates dialogue 236 with a user by providing a story tag for a particular one of interaction template 240 and phone number 230 associated with mobile device 204. For example, RBM agent 238 may initiate dialogue 236 using a POST request submitted by client applications formatted as follows:

POST /rcs/v1/<agent>/dialogue/<story>/<phone>

For example, the POST request:

POST
https://rcs.cftxt.net/rcs/v1/1/dialogue/jobNotification/
18185551212{"ttl": 20}

This request is used to initiate a dialogue between a mobile device at telephone number "18185551212" based on the interaction template "jobNotification" And request body with values for all dynamic place holders in RCS cards is provided below. This will be sent as part of API request from ADP to RBM and finally to user's device. RBM uses this information to fill the templates which are pre-set.

Interaction template 240, sometimes referred to as a "story object" describes a conversational flow between RBM agent 238 and mobile device 204 of user 214 that has been contacted. Interaction template 240 is largely formalized as "if this response, send this message" style tuples; however, interaction template 240 also carries metadata attributes similar to the metadata attributes of messages 244.

For example, the interaction template "jobNotification" can take the form of a JSON object such as:

```
{
  "tag":"jobNotification",
  "first message":"jobMessage",
  "hint":"ADP job notification",
  "events    url":"https://adp-rcs.callfire.com/notification-event",
  "sequence":{
    "jobMessage/*":{
      "message":"ApplyMessage"
    }
  },
  "dialogue_time":386400,
  "tag":"jobNotification",
  "default_response":{
    "message":"default JobMessage"
  }
}
```

If a story is not pre-set as a template with RBM, a default message template will be used. For example, a default template for default message can take the form of a JSON object such as:

```
{
  "send_window":[
  ],
  "send latest":1620246238.1557,
  "hint":"ADP job notification",
  "rcs_content":"Default message is displayed",
  "events_url":null,
  "suggestions":[
  ],
  "tag":"defaultJobMessage",
  "ttl":0,
  "rc_s_type":"text"
}
```

Upon initiation of dialogue 236, RCS API 242 finds the first one of messages 244 indicated by the identified interaction template 240. ACS API 242 queues the first one of messages 244 for sending to user 214 at mobile device 204.

Each of messages 244 represents a stored template of the actual RCS payload to be sent from RBM agent 238 to user 214 of mobile device 204. Messages 244 may also include metadata such as a unique identifier, a description, scheduling attributes, and other appropriate attributes. Message objects can be aggregated into one or more stories and sequenced depending on the user response.

For example, the first message object "jobMessage" of the interaction template "jobMessage" can take the form of a JSON object such as:

```
{
    "tag": "jobMessage",
    "hint": "ADP job postings",
    "rcs_type": "carousel",
    "rcs_content": [{"card": "card1", "orientation": "VERTICAL"}],
    "ttl": 120
}
```

For reusability purposes, some parts of the message, such as, for example, cards and media files, can be saved and managed separately. For example, the first message object "jobMessage" can include the separately managed object "card1" and can take the form of a JSON object such as:

```
{
    "tag": "card1",
    "title": "ADP job postings",
    "description": "We have identified the following job opportunities based on your profile.",
    "media": "cardMedia1",
    \"suggestions": [
        {
            "tag": "apply",
            "text": "Apply",
            "reply": "apply"
        },
    ]
}
```

For example, the first message object "jobMessage" can include the separately managed carousel object "jobMessage" and can take the form of a JSON object such as:

```
{
    "tag":"jobMessage",
    "send_latest":1620246238.1557,
    "hint":"ADP job postings",
    "rcs content":{
        "cards":[
            "card1",
            "card2",
            "card3",
            "card4",
            "card5",
            "card6",
            "card7",
            "card8",
            "card9",
            "card10",
        ],
        "width":"SMALL"
    },
    "events_url":null,
    "suggestions":[
    ],
    "ttl":0,
    "rcs_type":"carousel"
}
```

For example, the carousel object "jobMessage" can include the separately managed card object "card1" and can take the form of a JSON object such as:

```
{
    "tag":"card1",
    "media":"jobMedia1",
    "suggestions":[
        {
            "text":"Apply",
            "tag":"Apply",
            "reply":"<*jobId1*>"
        }
    ],
    "description":" ",
    "title":"<*jobTitle1*>"
}
```

The template for displaying multimedia,

```
{
    "tag":"card1",
    "title":" ",
    "url":"https://encrypted-tbn0.gstatic.com/images?q=tbn:
        ANd9GcQ8Flncn1FvRr4zPkOak_DCuhrVpv
        Pwzloijv8xmRRurf9S1EsL<https://encrypted-
        tbn0.gstatic.com/images?q=tbn:
        ANd9GcQ8Flncn1FvRr4zPkOak_DCuhrVpv
        Pwzloijv8xmRRurf9S1EsL>",
    "tag":"jobMedia1",
    "height":"SHORT",
    "gid":"files/jvfb780gghGjhXsqAlrkprWD",
    "mime_type":"image/png"
}
```

To send message 246 to mobile device 204 at phone number 230, transmission object 248 needs to be generated. Transmission object 248 is the materialized form of message 246 at the time it is being sent. Transmission object 248 is based on a pre-existing one of message 246 of messages 244. Transmission object 248 needs to have a phone number to be sent to, priority and timing information, and a substitution list of variable-value tuples if the message contains any variables.

For example, substitution list can take the form of a JSON object such as:

```
{
    "replacements":{
        "jobTitle1":"Sr. Java Developer",
        "jobMedia1":"https://encrypted-tbn0.gstatic.com/
            images?q=tbn:
            ANd9GcQ8Flncn1FvRr4zPkOak_DCuhrVpv
            Pwzloijv8xmRRurf9S1EsL <https://slack-redir.net/
            link?url=https://encrypted-tbn0.gstatic.com/
            images?q%3Dtbn:
            ANd9GcQ8Flncn1FvRr4zPkOak_DCuhrV
            pvPwzloijv8xmRRurf9S1EsL>",
        "jobId1":"hp",
        "jobTitle2":"java BackEnd Developer",
        "jobMedia2":"https://encrypted-tbn0.gstatic.com/
            images?q=tbn:ANd9GcROfFrZGD-
            gHnrlfpvqrLYJXBry6qvsdhZGPcBPfCQ1R2ZY2-
            GmK<https://slack-redir.net/link?url=https://en-
            crypted-tbn0.gstatic.com/images?q%3Dtbn:
            ANd9GROfFrZGD-
            gHnrlfpvqrLYJXBry6qvsdhZGPcBPfCQ1R2ZY2-
            GmK>",
        "jobId2":"twitter"
    }
}
```

RBM agent 238 creates transmission object 248 based on message 246 of interaction template 240. RBM agent 238 then schedules transmission object 248 for sending, according to rules 250. Rules 250 can include rules for sending transmissions as well as specific dialogue rules that, if present, may override the transmission rules.

In one illustrative example, multiple job postings received from different organizations can be aggregated and sent within a single transmission object. In this illustrative example, RBM agent 238 creates transmission object 248 building the transmission object 248 to indicate the relative organizational context of the different job postings. For example, the transmission object 248 indicates the first job posting within a context the first organization and indicates the second job posting within a context the second organization.

In one illustrative example, RCS API 242 determines a gateway for sending transmission object 248, such as by performing a LCR algorithm. As stated above, the phone RCS capabilities 232 are checked; message 246 is relayed to an MMS or SMS gateway if mobile device 204 does not support RCS.

If mobile device 204 does support RCS, message 246 is rendered according to the RCS gateway rules 250 to obtain the content payload. Variable-value substitutions are performed according to the list of variable-value tuples, dynamically replacing parts of the message content. Transmission object 248 is then scheduled for sending at either a later time, or as soon as possible. When the sending time has come, a check is made to ensure the time restrictions are not in effect, and then the transmission is queued by default in the lowest priority queue. From there, the transmission payload is collected when its turn comes, and transmission object 248 gets sent to gateway 222 for telephony service 252.

RCS API 242 replies to RBM agent 238 above with a description of the dialogue object sent to mobile device 204. This would be an indication that the last message has been delivered to mobile device 204; however, RBM agent 238 may receive information that message 246 has been scheduled, may have been bounced, may have been read by the user, as well as other suitable indications.

RCS API 242 updates and registers events and transmission states over the lifetime of transmission object 248. If requested, RCS API 242 communicates the events and transmission states back to RBM agent 238 via a provided REST API interface.

For example, upon delivery of message object "jobMessage," RCS API 242 from user's device can reply to RBM agent 238 by posting a reply using HTTP Post:
    POST https://adp-rcs.callfire.com/applyMessage/confirm?dialogue= . . . dialogue_id . . . &user= . . . . PHONE . . . &story=jobNotification&message= jobMessage& message=jobID
}

In one illustrative example, a message, such as message 246, is sent to call for response 247 from user 214. User 214 may press a button offered by message 246, in which case another message having information 249 is sent. For example, the message below is posted back to user 214 when user 214 selects "Apply" from the card above,
{
    "send_latest":1620246238.1557,
    "hint":"ADP job postings",
    "rcs_content":"Thank you for applying the job",
    "tag":"ApplyMessage",
    "ttl":0,
    "rcs_type":"text"

Alternatively, user 214 may respond with an expected word, in which case yet another message having different information 249 can be sent. Still further, user 214 may type an unexpected response, in which case a third type of message having different information 249 is sent.

For example, RCS API 242 may indicate response 254 from user 214 by a POST request formatted as follows:
    POST https://adp-rcs.callfire.com/applyMessage/confirm?dialogue= . . . dialogue_id . . . &user=1818-5551212&story=jobNotification&message=jobMessage&message=jobId In one illustrative example, interaction template 240 can also offer "catch-anywhere" handling to account for different responses from user 214. For example, user 214 may type "customer service" at any time during dialogue 236. Upon receiving information 249 in the corresponding one of response 247, RBM agent 238 may send a subsequent one of message 246 in which a phone call is offered.

In this manner, interaction template 240 provides dynamic control of dialogue 236. For example, instead of hardcoding message 246 to be sent in response to response 247, the content information 249 of response 247 and the context will be sent to RBM agent 238 via a customer-provided REST API. RBM agent 238 is expected to indicate the next message to send according to interaction template 240.

Response 247 is processed based on the story rules 250. If a matching message tag and response pattern is found, the next transmission is built based on the message indicated, and queued for sending as soon as possible. If, instead of a static message tag, a URL is indicated as the message to be sent, gateway 222 sends a POST request to that gateway, with context information (the tag of the last message sent, user's response, timestamp, etc). Thus, when invoked, RBM agent 238 will typically do its own processing, and return the tag of message 246 to be sent next, plus any optional variable-value tuples to be replaced.

In this manner, interaction template 240 provides dynamic control of dialogue 236. For example, instead of hardcoding message 246 to be sent in response to response 247, RCS API 242 sends the content and the context information 249 of response 247 to RBM agent 238 via a customer-provided REST API. RBM agent 238 is expected to indicate the next message to send according to interaction template 240.

RCS API 242 would then wait for RBM agent 238 to indicate a next one of messages 244 to send. RBM agent 238 may reply with a message confirmation, such as:
{"message": "apply"}

For example, upon indication of response 247 from user 214, RBM agent 238 can reply to RCS API 242 by posting a next one of messages 244 that can take the form of a JSON object such as:
{
    "tag": "apply",
    "hint": "ADP confirmation of job application",
    "rcs_type": "text",
    "rcs_content": "Thank you. Your application has been submitted for consideration.",
}

Upon indication of a positive response 247 from user 214, recruiting service 216 can submit the user as a candidate for the job. For example, recruiting service 216 can post a candidate object that can take the form of a JSON object. The candidate object can include information from the response indicating the candidate's interest in the job posting.

As a result, recruiting system 201 operates as a special purpose computer system in which components thereof leverage RCS messaging to enable over one or more computer networks. Thus, recruiting system 201 transforms the systems therein into a special purpose computer system as compared to currently available general computer systems that do not have recruiting system 201. Currently used general purpose computer systems do not leverage RCS messaging to enable communicating employment opportunities to job candidates over one or more computer networks.

Figure 3:
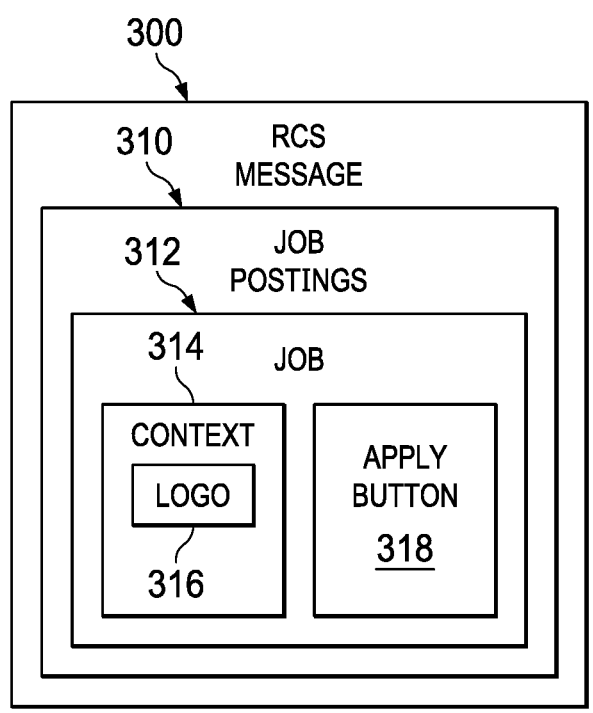
FIG. 3 is a block diagram of an RCS message in accordance with an illustrative embodiment.

With reference next to FIG. 3, a block diagram of a RCS message is depicted in accordance with an illustrative embodiment. RCS message 300 is one example of a transmission object communicated as part of a message dialogue, such as transmission object 248 as shown in block form in FIG. 2.

As depicted, RCS messages 300 includes one or more job postings 310. Each job 312 of job postings 310 corresponds to one of job postings that has been matched to the message recipient, such as job posting 208, shown in block form in FIG. 2. In one illustrative example, job postings 310 is presented as a Carousal of multiple jobs matched with the applicant's profile. Making multiple such job postings available in a single RCS message allows a user to view and apply for one or many postings instantly.

For each job in the job postings 300 and, such as job 312, RCS message 300 provides a complete context 314 for the job description, including the company logo 316. Company logo 316, along with any service provider branding, provides the applicant with a measure of veracity and authenticity of RCS message 300.

As depicted, job 312 includes apply button 318. Apply button 318 enables a job applicant to instantly apply for job from within the RCS Message.

Figure 5:
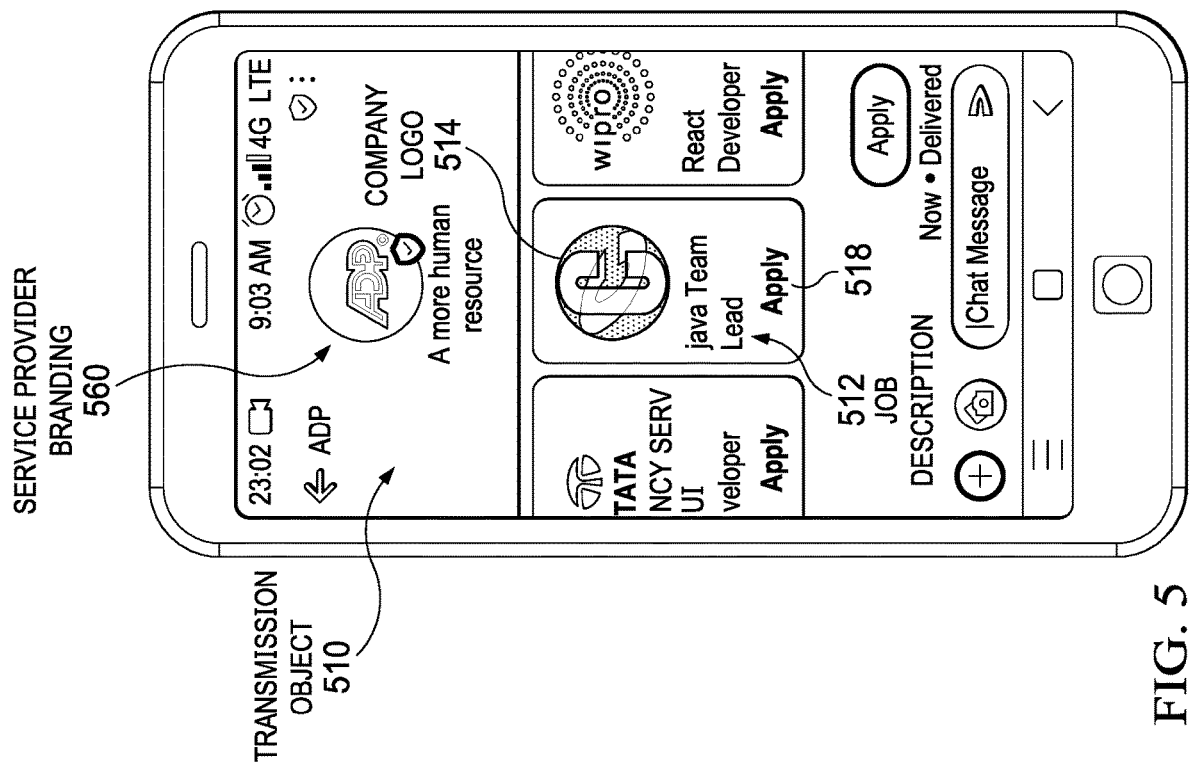
FIG. 5 is an illustration of a graphical user interface for displaying employment opportunities on an RCS-enabled mobile device in accordance with an illustrative embodiment.
Figure 4:
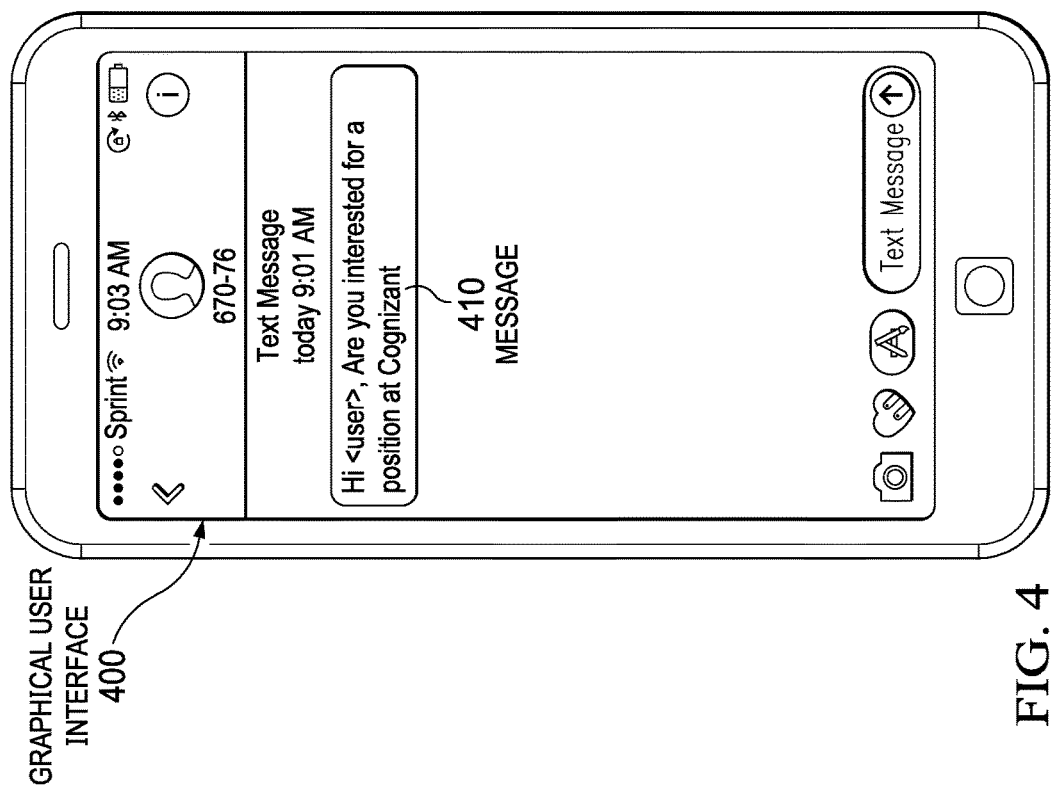
FIG. 4 is an illustration of a graphical user interface for submitting a user transaction in accordance with an illustrative embodiment.

With reference next to FIGS. 4-5, illustrations of a graphical user interface for submitting a user transaction on a secondary device are depicted in accordance with an illustrative embodiment. The process depicted in the graphical user interface of FIGS. 4-5 may be implemented in recruiting system 201 and, in particular, in mobile device 204 as shown in block form in FIG. 2.

Referring now specifically to FIG. 4, graphical user interface 400 displays a prompt for a user to confirm interest in and employment opportunity using an RCS enabled mobile device registered to the user. Message 410 can be a first message generated from an interaction template, such as message 246 and interaction template 240, both shown in block form in FIG. 2.

With reference next to FIG. 5, an illustrations of a graphical user interface for displaying employment opportunities on an RCS-enabled mobile device is depicted in accordance with an illustrative embodiment. The process in FIG. 5 may be implemented in recruiting system 201 and, in particular, in mobile device 204 shown in block form in FIG. 2.

Upon indicating interest in a particular employment opportunity, a transmission object 510 is displayed that provides a complete context for the job description 512, including the company logo 514 and service provider branding 516.

With RCS Business Messaging services, the user does not necessarily see a "from" number on their messaging screen. Instead, as illustrated in FIG. 5, the message can be presented with a logo of the business organization that is sending the communication. The user has the ability to review the information about this organization exposed by the RCS agent. The graphical view of the business logo and the additional information and assurances displayed in the RCS enabled messaging application on the device help increase trust from the end user. This type of message presentation helps in preventing phishing or unauthorized impersonation of the business organization by bad actors, which may attempt to trick the user into believing that they are interacting with the business organization.

If the user clicks the "apply" button 518, as shown in FIG. 5, a message is sent by the mobile device indicating the candidate's interest in the job posting, and triggering submission of the candidate's employment credentials to the employer.

Figure 6:
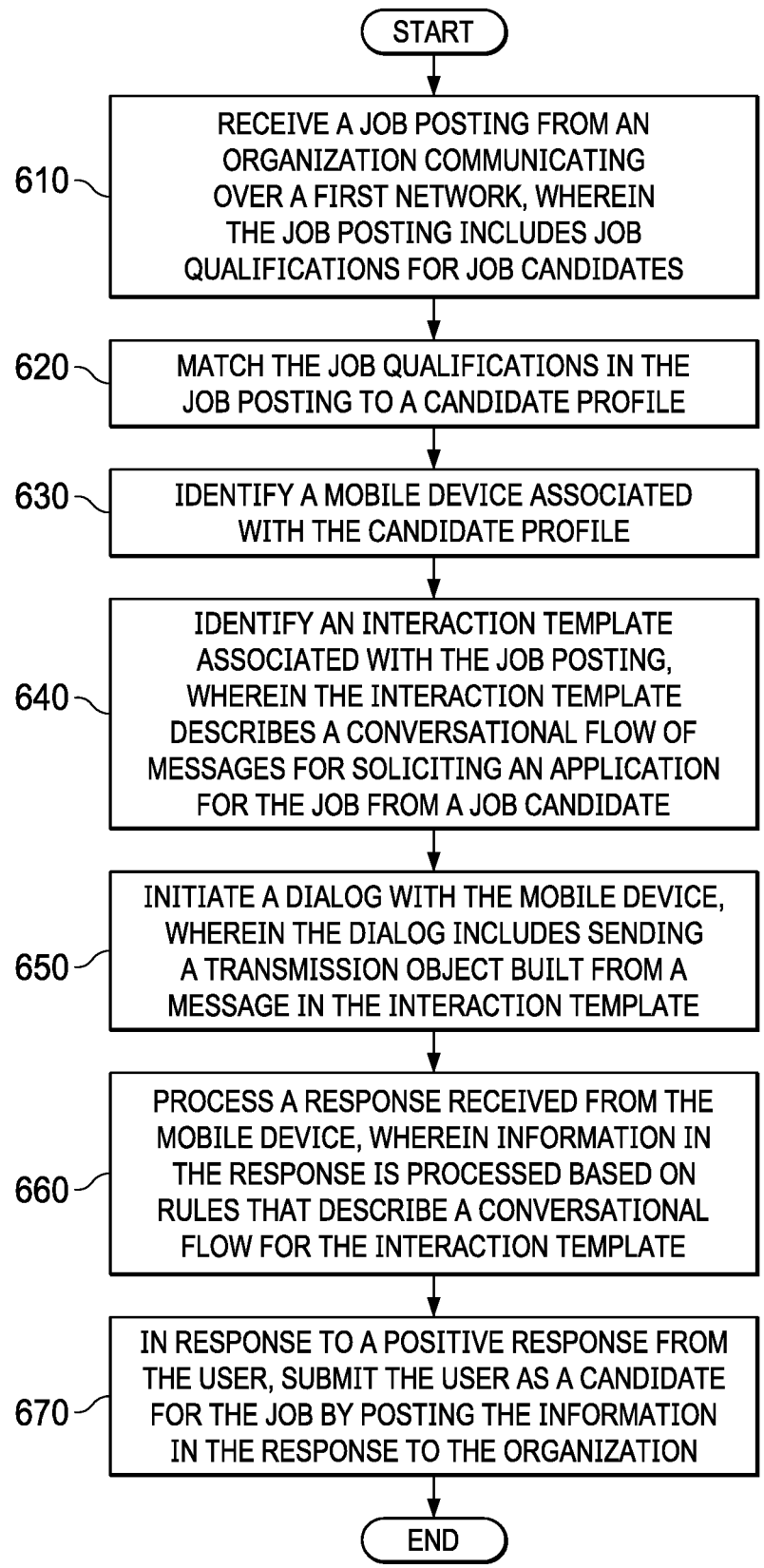
FIG. 6 is a flowchart of a process for communicating employment opportunities to job candidates in accordance with an illustrative embodiment.

Referring now to FIG. 6, an illustration of a flowchart of a process for communicating employment opportunities to job candidates is depicted in accordance with an illustrative embodiment. The process of FIG. 6 can be a software process implemented in one or more components of a human resources modeling system, such as in gateway 220 and RBM agent 238 of FIG. 2.

Process 600 begins by receiving a job posting from an organization communicating over a first network (step 610). The job posting includes job qualifications for job candidates.

The process matches the job qualifications in the job posting to a candidate profile (step 620).

The process identifies a mobile device associated with the candidate profile (step 630).

The process identifies an interaction template associated with the job posting (step 640). The interaction template describes a conversational flow of messages for soliciting an application for the job from a job candidate.

The process initiates a dialogue with the mobile device (step 650). The dialogue includes sending a transmission object built from a message in the interaction template.

The process processes a response received from the mobile device (step 660). The information in the response is processed based on rules that describe a conversational flow for the interaction template.

In response to a positive response from the user, the process submits the user as a candidate for the job by posting the information in the response to the organization (step 670), with the process terminating thereafter.

Referring now to FIG. 7, an illustration of a flowchart of a process for matching the job posting to the job candidates is depicted in accordance with an illustrative embodiment. The process of FIG. 6 is one example of step 620, of the process of FIG. 6.

The process defines a set of structured words to be used by both the job candidates and the organization in defining the job qualifications and candidate qualifications (step 710).

The process matches the job posting to the job candidates using the set of structured words (step 720).

Referring now to FIG. 8, an illustration of a flowchart of a process for communicating multiple employment opportunities to job candidates is depicted in accordance with an illustrative embodiment. The process of FIG. 8 can be implemented in conjunction with the process of FIG. 6.

The process identifies a second job posting that matches the candidate profile (step 810). The second job posting is received from a second organization.

The process builds the transmission object (step 820). The transmission object indicates the first job posting within a context the first organization and indicates the second job posting within a context the second organization.

Referring now to FIG. 9, an illustration of a flowchart of a process for submitting a candidate for the job is depicted in accordance with an illustrative embodiment. The process of FIG. 8 can be implemented in conjunction with the process of FIG. 6.

The process identifies candidate qualifications from the candidate profile (step 910).

The process submits the candidate qualifications to the organization with the information in the response (step 920).

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
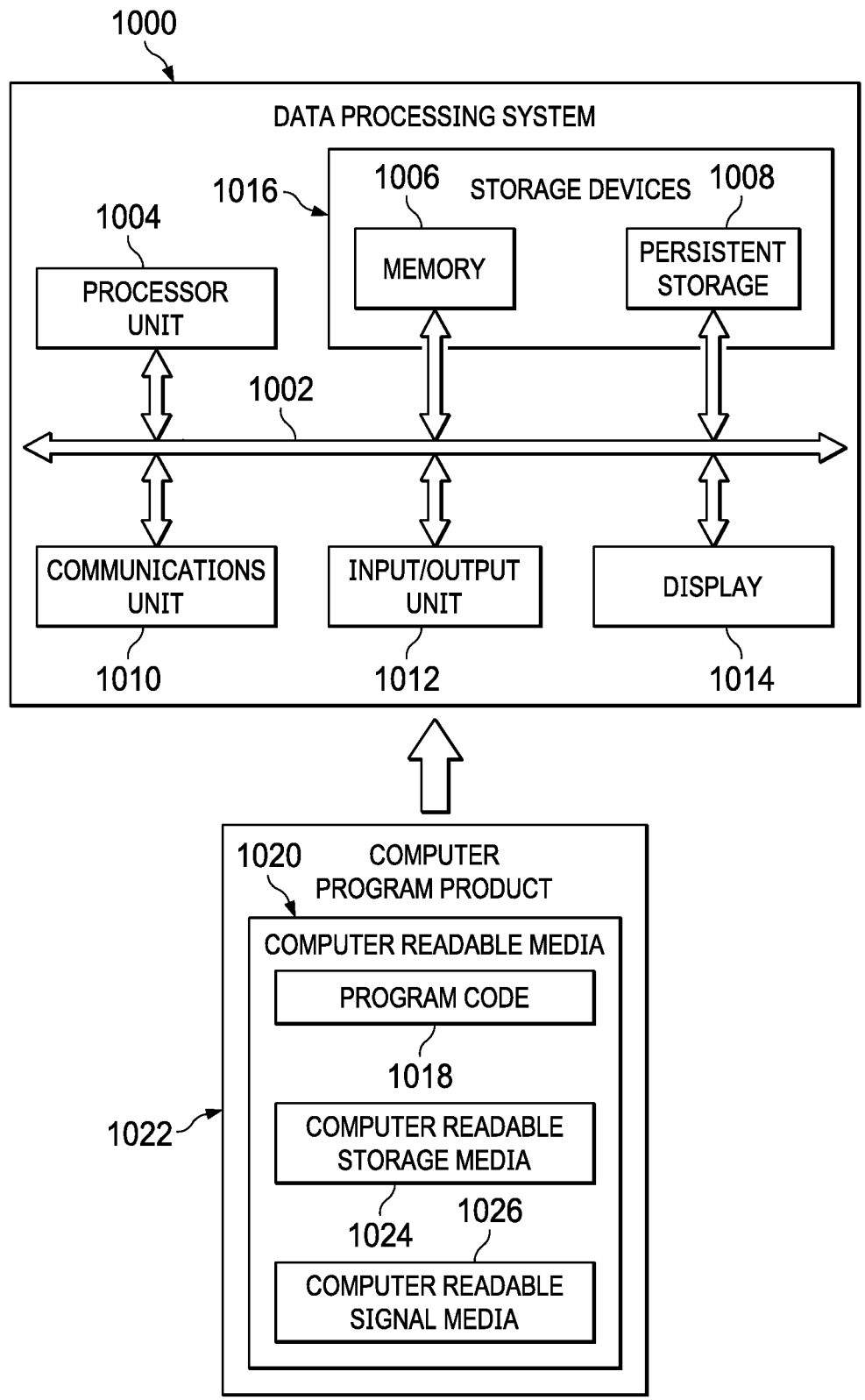
FIG. 10 is a block diagram of a data processing system in accordance with an illustrative embodiment.

Turning now to FIG. 10, an illustration of a block diagram of a data processing system is depicted in accordance with an illustrative embodiment. Data processing system 1000 may be used to implement one or more of recruiting system 201, and mobile device 204 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer readable storage devices in these illustrative examples. Memory 1006, in these examples, may be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a solid state hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these illustrative examples. In one example, computer readable media 1020 may be computer readable storage media 1024 or computer readable signal media 1026.

In these illustrative examples, computer readable storage media 1024 is a physical or tangible storage device used to store program code 1018 rather than a medium that propagates or transmits program code 1018.

Alternatively, program code 1018 may be transferred to data processing system 1000 using computer readable signal media 1026. Computer readable signal media 1026 may be, for example, a propagated data signal containing program code 1018. For example, computer readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

Further, as used herein, "computer-readable media 1020" can be singular or plural. For example, program code 1018 can be located in computer-readable media 1020 in the form of a single storage device or system. In another example, program code 1018 can be located in computer-readable media 1020 that is distributed in multiple data processing systems. In other words, some instructions in program code 1018 can be located in one data processing system while other instructions in in program code 1018 can be located in one data processing system. For example, a portion of program code 1018 can be located in computer-readable media 1020 in a server computer while another portion of program code 1018 can be located in computer-readable media 1020 located in a set of client computers.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected were chosen and described in order to best explain the principles of the embodiments, the practical application, and to enable others of ordinary skill in the art to understand the disclosure for various embodiments with various modifications as are suited to the particular use contemplated.

What is claimed is:

1. A method for communicating employment opportunities to job candidates, the method comprising:

receiving, by one or more processing circuits, a job posting from an organization communicating over a first network, wherein the job posting includes job requirements for the job candidates;

matching, by the one or more processing circuits, the job requirements included in the job posting to a candidate profile;

identifying, by the one or more processing circuits, a mobile device of a user associated with the candidate profile;

identifying, by the one or more processing circuits, an interaction template associated with the job posting, wherein the interaction template is a Java Script Object Notation (JSON) object that describes a conversational flow as a series of message tuples for soliciting an application for the job from a job candidate of the job candidates, wherein the interaction template comprises a plurality of message objects that can be sequenced depending on responses of the user, and wherein parts of the plurality of message objects can be saved as separately managed objects in the form of JSON objects for reusability purposes;

initiating, by the one or more processing circuits, a dialogue with the mobile device, wherein the dialogue includes sending, via a Rich Communication Services (RCS) message, a transmission object built from a first message object of the plurality of message objects included in the interaction template, wherein multiple job postings having job requirements that match the candidate profile are aggregated and sent within the transmission object, and wherein the multiple job postings are received from different organizations;

adding, by the one or more processing circuits responsive to the job requirements included in the job posting matching the candidate profile, a second message object to the transmission object, the second message object to represent a payload for the RCS message that includes a graphic element identifying the organization;

displaying, by the one or more processing circuits, content of the transmission object on the mobile device through a graphical user interface, wherein the content of the transmission object provides a complete context of a job description for the job posting and the complete context of the job description for the job posting including the graphic element identifying the organization;

processing, by the one or more processing circuits, a response received from the mobile device, wherein information in the response is processed based on rules that describe the conversational flow for the interaction template; and in response to a positive response from the user, submitting, by the one or more processing circuits, the user as a candidate for the job by posting the information in the response to the organization.

2. The method of claim 1, further comprising:

defining, by the one or more processing circuits, a set of structured words to be used by both the organization in defining the job requirements and the job candidates in defining candidate qualifications; and matching, by the one or more processing circuits, the job posting to the job candidates using the set of structured words.

3. The method of claim 1, wherein the mobile device includes a Subscriber Identity Module (SIM) that is associated with a Rich Communication Services (RCS) identity of the user.

4. The method of claim 1, wherein the transmission object indicates the job posting within a context of the organization by substituting business specific information in place of variables in the message when the transmission object is built.

5. The method of claim 4, wherein the job posting is a first job posting and the organization is a first organization, the method further comprising:

identifying, by the one or more processing circuits, a second job posting that matches the candidate profile, wherein the second job posting is received from a second organization; and building, by the one or more processing circuits, the transmission object, wherein the transmission object indicates the first job posting within a context of the first organization and indicates the second job posting within a context of the second organization.

6. The method of claim 1, wherein submitting the user as the candidate for the job, further comprises:

identifying, by the one or more processing circuits, candidate qualifications from the candidate profile; and submitting, by the one or more processing circuits, the candidate qualifications to the organization with the information in the response.

7. The method of claim 1, wherein the candidate profile includes a verified employment history.

8. A computer system comprising:

a hardware processor; and a recruiting system, in communication with the hardware processor, and configured:

to receive a job posting from an organization communicating over a first network, wherein the job posting includes job requirements for job candidates;

to match the job requirements included in the job posting to a candidate profile;

to identify a mobile device of a user associated with the candidate profile;

to identify an interaction template associated with the job posting, wherein the interaction template is a Java Script Object Notation (JSON) object that describes a conversational flow as a series of message tuples for soliciting an application for the job from a job candidate of the job candidates, wherein the interaction template comprises a plurality of message objects that can be sequenced depending on responses of the user, and wherein parts of the plurality of message objects can be saved as separately managed objects in the form of JSON objects for reusability purposes;

to initiate a dialogue with the mobile device, wherein the dialogue includes sending, via a Rich Communication Services (RCS) message, a transmission object built from a first message object of the plurality of message objects included in the interaction template, wherein multiple job postings having job requirements that match the candidate profile are aggregated and sent within the transmission object, and wherein the multiple job postings are received from different organizations;

to add, responsive to the job requirements included in the job posting matching the candidate profile, a second message object to the transmission object, the second message object to represent a payload for the RCS message that includes a graphic element identifying the organization;

to display content of the transmission object on the mobile device through a graphical user interface, wherein the content of the transmission object provides a complete context of a job description for the job posting and the complete context of the job description for the job posting including the graphic element identifying the organization;

to process a response received from the mobile device, wherein information in the response is processed based on rules that describe the conversational flow for the interaction template; and in response to a positive response from the user, to submit the user as a candidate for the job by posting the information in the response to the organization.

9. The computer system of claim 8, wherein the recruiting system is further configured:

to define a set of structured words to be used by both the organization in defining the job requirements and the job candidates in defining candidate qualifications; and to match the job posting to the job candidates using the set of structured words.

10. The computer system of claim 8, wherein the mobile device includes a Subscriber Identity Module (SIM) that is associated with a Rich Communication Services (RCS) identity of the user.

11. The computer system of claim 8, wherein the transmission object indicates the job posting within a context of the organization by substituting business specific information in place of variables in the message when the transmission object is built.

12. The computer system of claim 11, wherein the job posting is a first job posting and the organization is a first organization, and wherein the recruiting system is further configured:

to identify a second job posting that matches the candidate profile, wherein the second job posting is received from a second organization; and to build the transmission object, wherein the transmission object indicates the first job posting within a context of the first organization and indicates the second job posting within a context the second organization.

13. The computer system of claim 8, wherein in submitting the user as the candidate for the job, the recruiting system is further configured:

to identify candidate qualifications from the candidate profile; and to submit the candidate qualifications to the organization with the information in the response.

14. The computer system of claim 8, wherein the candidate profile includes a verified employment history.

15. A computer program product for communicating employment opportunities to job candidates comprising:

a non-transitory computer readable storage media having program code stored thereon:

program code, stored on the computer readable storage media, for receiving a job posting from an organization communicating over a first network, wherein the job posting includes job requirements for the job candidates;

program code, stored on the computer readable storage media, for matching the job requirements included in the job posting to a candidate profile;

program code, stored on the computer readable storage media, for identifying a mobile device of a user associated with the candidate profile;

program code, stored on the computer readable storage media, for identifying an interaction template associated with the job posting, wherein the interaction template is a Java Script Object Notation (JSON) object that describes a conversational flow as a series of message tuples for soliciting an application for the job from a job candidate of the job candidates, wherein the interaction template comprises a plurality of message objects that can be sequenced depending on responses of the user, and wherein parts of the plurality of message objects can be saved as separately managed objects in the form of JSON objects for reusability purposes;

program code, stored on the computer readable storage media, for initiating a dialogue with the mobile device, wherein the dialogue includes sending, via a Rich Communication Services (RCS) message, a transmission object built from a first message object of the plurality of message objects included in the interaction template, wherein multiple job postings having job requirements that match the candidate profile are aggregated and sent within the transmission object, and wherein the multiple job postings are received from different organizations;

program code to add, responsive to the job requirements included in the job posting matching the candidate profile, a second message object to the transmission object, the second object to represent a payload for the RCS message that includes a graphic element identifying the organization;

program code, stored on the computer readable storage media, for displaying content of the transmission object on the mobile device through a graphical user interface, wherein the content of the transmission object provides a complete context of a job description for the job posting and the complete context of the job description for the job posting including the graphic element identifying the organization;

program code, stored on the computer readable storage media, for processing a response received from the mobile device, wherein information in the response is processed based on rules that describe the conversational flow for the interaction template; and program code, stored on the computer readable storage media, for in response to a positive response from the user, submitting the user as a candidate for the job by posting the information in the response to the organization.

16. The computer program product of claim 15, further comprising:

program code, stored on the computer readable storage media, for defining a set of structured words to be used by both the organization in defining the job requirements and the job candidates in defining candidate qualifications; and program code, stored on the computer readable storage media, for matching the job posting to the job candidates using the set of structured words.

17. The computer program product of claim 15, wherein the mobile device includes a Subscriber Identity Module (SIM) that is associated with a Rich Communication Services (RCS) identity of the user.

18. The computer program product of claim 15, wherein the transmission object indicates the job posting within a context of the organization by substituting business specific information in place of variables in the message when the transmission object is built.

19. The computer program product of claim 18, wherein the job posting is a first job posting and the organization is a first organization, the program code further comprising:

program code, stored on the computer readable storage media, for identifying a second job posting that matches the candidate profile, wherein the second job posting is received from a second organization; and program code, stored on the computer readable storage media, for building the transmission object, wherein the transmission object indicates the first job posting within a context of the first organization and indicates the second job posting within a context of the second organization.

20. The computer program product of claim 15, wherein the program code for submitting the user as the candidate for the job, further comprises:

program code, stored on the computer readable storage media, for identifying candidate qualifications from the candidate profile; and program code, stored on the computer readable storage media, for submitting the candidate qualifications to the organization with the information in the response.

21. The computer program product of claim 15, wherein the candidate profile includes a verified employment history.

* * * * *